United States Patent [19]

Genovese

[11] Patent Number: 5,153,608
[45] Date of Patent: Oct. 6, 1992

[54] SKEW AND BOW CORRECTION SYSTEM FOR AN IMAGE SCANNER

[75] Inventor: Frank C. Genovese, Fairport, N.Y.

[73] Assignee: Xerox Corporation, Stamford, Conn.

[21] Appl. No.: 766,295

[22] Filed: Sep. 27, 1991

[51] Int. Cl.$^5$ .............................................. G01D 9/42
[52] U.S. Cl. ................... 346/108; 359/211; 359/219
[58] Field of Search ............... 346/108; 359/209, 211, 359/196, 216, 217, 218, 219

[56] References Cited

U.S. PATENT DOCUMENTS

| | | | |
|---|---|---|---|
| 4,040,096 | 8/1977 | Starkweather | 358/302 |
| 4,084,881 | 4/1978 | Hirabayashi et al. | 359/219 |
| 4,152,052 | 5/1979 | Lessman | 352/107 |
| 4,804,981 | 2/1989 | Prakash et al. | 346/160 |
| 4,847,642 | 7/1989 | Murayama et al. | 346/157 |
| 4,866,459 | 9/1989 | Tokita et al. | 346/108 |
| 4,956,650 | 9/1990 | Allen et al. | 346/108 |
| 5,018,808 | 5/1991 | Meyers et al. | 359/211 |
| 5,055,860 | 10/1991 | Bannai | 346/108 |

Primary Examiner—A. T. Grimley
Assistant Examiner—Sandra L. Brase
Attorney, Agent, or Firm—R. Hutter

[57] ABSTRACT

A skew and bow correction system for a line of beam scanning from a source across a photosensitive surface comprises at least one optical element, having an axis along the line of beam scanning. The principal plane of the optical element at the midpoint of the line of beam scanning is positioned at a first angle relative to the surface, and the principal plane of the optical element at each end of the scan line is oriented relative to the first angle at a twist angle along the axis. The value of the first angle is related to the skew and the bow of the scan line on the surface, and the values of the twist angles are related to the skew of the scan line on the surface.

17 Claims, 4 Drawing Sheets

SKEW AND BOW CORRECTION SYSTEM FOR AN IMAGE SCANNER

FIELD OF THE INVENTION

The present invention relates to scanning systems wherein a scan line is projected onto a photoconductive surface, as in, for example, an electrophotographic printer. Specifically, the present invention provides optical means for removing skew and bow from such projected scan lines.

BACKGROUND OF THE INVENTION

Electrophotographic printers wherein a laser scan line is projected onto a photoconductive surface are well known. In the case of laser printers, facsimile machines, and the like, it is very common to employ a raster output scanner (ROS) as a source of signals to be imaged on a photoreceptor (a photosensitive plate, belt, or drum) for purposes of xerographic printing. The ROS provides a laser beam which switches on and off as it moves, or scans, across the photoreceptor, to form the desired image on the photoreceptor. A common technique for effecting this scanning across the photoreceptor is to employ a rotating polygon surface; the laser beam from the ROS is reflected off the facets of the polygon, creating a scanning motion of the beam, which forms a scan line across the photoreceptor.

FIG. 1 shows the well-known basic configuration of a scanning system used, for example, in an electrophotographic printer or facsimile machine. A laser source 10 produces a collimated laser beam 12 which is reflected from the facets of a rotating polygon 14. The polygon surface 14 deflects the laser beam 12 to direct a line of beam scanning 16 toward the photoreceptor 18. When the line of beam scanning 16 reaches photoreceptor 18, a scanning line 20 results across photoreceptor 18. In FIG. 1, the photoreceptor 18 is shown as a rotating drum, but those skilled in the art will recognize that this general principle, and indeed the entire invention described herein, is applicable to situations where in the photoreceptor is a flat plate, a moving belt, or any other configuration. The periodic scanning of beam 16 across the rotating receptor 18 creates a raster, or array of scan lines, on the photoreceptor 18, creating the desired image to be printed. In real-world situations, such a configuration will typically further include any number of lenses and mirrors to accommodate a specific design. Unavoidable imprecisions in the shape and/or mounting of these optical elements will inevitably introduce certain anomalies in the quality of the scan line on the photoreceptor, and consequently create flaws in the printed document. Two important types of such anomalies are "skew" and "bow."

Skew is the error in rotational orientation of scan lines relative to the photoreceptor. As shown in FIG. 1, the scan line 20 is rotated slightly relative to a line 22, which is parallel with the axis of the photoreceptor 18. If the photoreceptor is a plate or belt, the scan line 20 may be skewed relative to an important base line, such as a line perpendicular to the edge of the belt. Further, if a number of rasters are superimposed on a document, as in a color copier, the different skews of the different rasters will cause a noticeable interference pattern on the document, to the great detriment of copy quality.

Bow is the quality of a scan line to form not a straight line on the photoreceptor, but a line which bows about a central midpoint. An example of bow is shown by scan line 20' in FIG. 1B. Even in a monochromatic printer, a pronounced bow of the lines in a raster will be noticeable. In a color printer or copier, the different extent and/or direction of bow for each superimposed color raster can be an important cause of a conspicuous color banding on the document.

Depending on the types of imprecision in the construction of the apparatus, the bow may bend in either direction relative to the center line 22. In manufacturing situations, it is also very common to have both skew and bow simultaneously evident in the scan line 20.

It is an object of the present invention to provide a simple means for correcting skew and bow in a scanning system.

Another object of the present invention is to provide such means which may be implemented as needed in individual electrophotographic printers as part of the manufacturing process.

Another object is to provide such means which may be simply adjusted as needed for individual electrophotographic printers.

Another object is to provide such means which may be constructed from simple and well-known parts.

Other objects will appear hereinafter.

SUMMARY OF THE INVENTION

In accordance with the above objects, the present invention is a skew and bow correction system for an electrophotographic printer or image scanner of the type providing a line of beam scanning from a source across a photosensitive surface. At least one optical element is disposed between the source and the surface. The principal plane of the optical element at the midpoint of the line of beam scanning is positioned along the line of beam scanning at a first angle relative to the surface, and the principal plane of the optical element at each end of the scan line is oriented at a twist angle along the axis relative to the first angle. The value of the first angle is related to the skew and the bow of the scan line on the surface, and the value of the twist angles is related to the skew of the scan line on the surface.

In a preferred embodiment of the present invention, the optical element is a simple flat plate, made of an optical grade flexible plastic. Adjustments to the first angle are made by rotating the plate at the desired angle relative to the photoconductive surface; adjustments to the second angle are made by simply twisting the plate along its axis. These adjustments may be made, at the end of the manufacturing process, by means of screws, as needed for the individual machine, and may be readjusted after delivery for the life of the machine.

Also in the preferred embodiment of the present invention, two optical elements of the type described are disposed in series between the scanner and the photoconductive surface. The first optical element is positioned and oriented to remove bow; the second optical element is positioned to counteract any additional skew caused by the elimination of bow by the first optical element.

BRIEF DESCRIPTION OF THE DRAWINGS

While the present invention will hereinafter be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Figure 1:
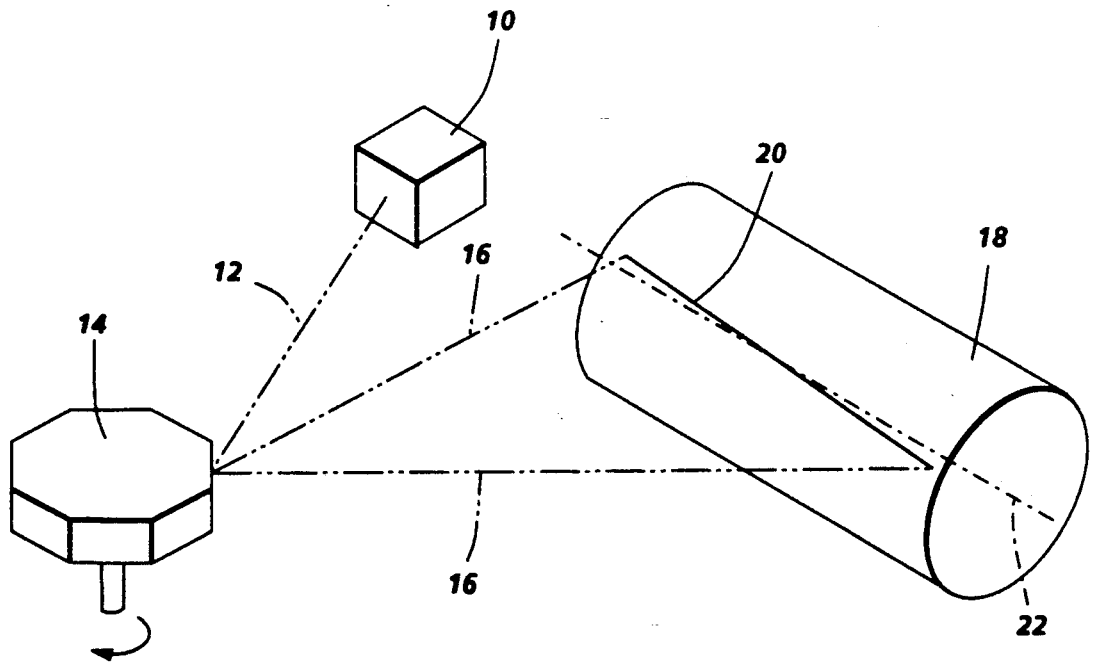
FIG. 1 is a partially simplified view of a scanning system, illustrating the problem of "skew" in prior art apparatus.
Figure 1B:
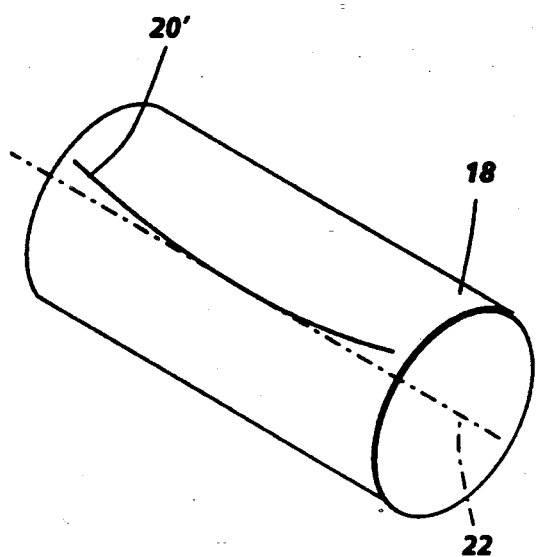
FIG. 1B is a simplified view of a portion of the apparatus shown in FIG. 1, illustrating the problem of "bow" in prior art apparatus.
Figure 2:
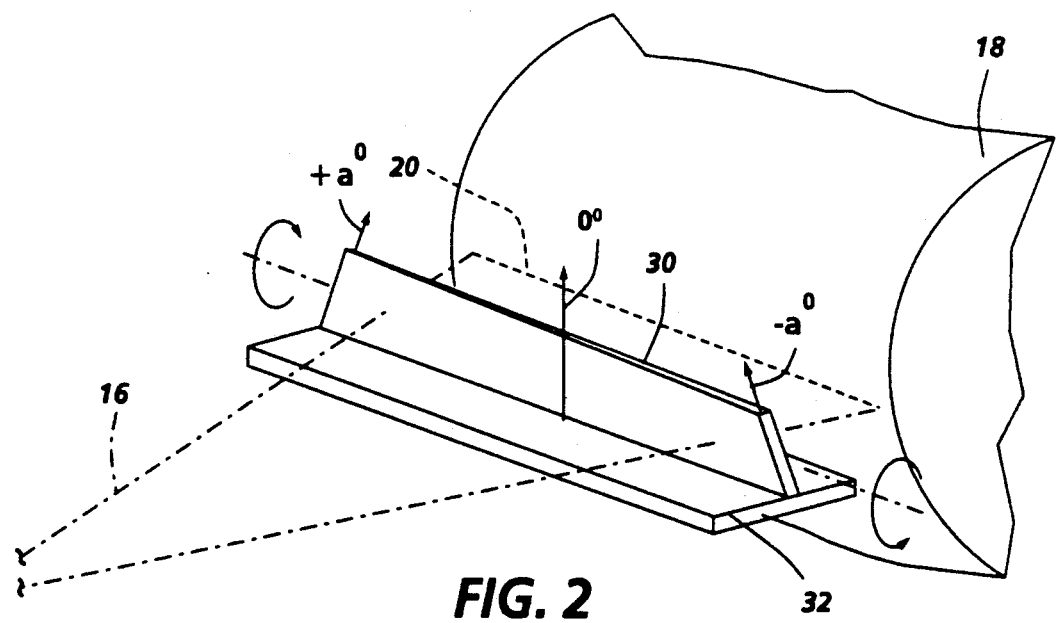
FIG. 2 is an elevational view of one type of optical element of the present invention, in conjunction with a photoreceptor.

FIG. 2 is a simplified perspective view of a beam 16 creating a scan line 20 against photoreceptor 18, incorporating an optical element 30 of the present invention. The optical element 30 is preferably a flexible, transparent piece of optical grade plastic, such as that known under the trade name "Lucite" or the synthetic resin known under the trade name "Plexiglas." Optical element 30 may be mounted on a vibration damping plate 32. As is shown in FIG. 2, the optical element 30 is disposed within the beam 16 in front of the photoreceptor 18. The optical element 30 is twisted along its longitudinal axis, forming a helix twisted symmetrically about its midpoint.

Looking closely at the relative angles at various points along the optical element 30 relative to the line of beam scanning 16 in FIG. 2, it is seen that a line through the principal plane of the element 30 at its midpoint is positioned at an angle marked 0°; that is, perpendicular to the beam 16 and parallel with the relevant tangent of photoreceptor 18. The ends of the optical element 30 are twisted as needed about this midpoint. The angle of orientation of the optical element 30 at its end points is given as small angles $+a°$ and $-a°$, equal and opposite deviations relative to the midpoint. This twisting of the optical element 30 will cause a skew to be created in the beam 16 and scan line 20, as will be explained below; however, the created skew can be employed to counteract the inherent skew in the apparatus. By manipulation of these small angles, the skew inherent in scan line 20 may be altered and eliminated.

(In the preferred embodiment of the present invention, the optical element is a flexible and adjustable flat plate, twisted at its endpoints to form a helix. In such an embodiment, it is straightforward to provide twist angles $+a°$ and $-a°$ which are equal and opposite relative to the angle of the midpoint. However, it is conceivable that, for special situations, an optical element within the scope of the claims may be of a rigid material predisposed in a specific curved shape. The optical element could be, for example, in the form of a twisted cylindrical lens or prism instead of a flat plate, although such a shape may introduce unnecessary complications to the system. In the case of a rigid optical element 30, the ends of the element 30 could be twisted to different extents relative to the midpoint, or the ends could be bent in the same direction relative to the midpoint; that is, the optical element 30 is preferably, but need not be, in the form of a helix.)

Figure 3:
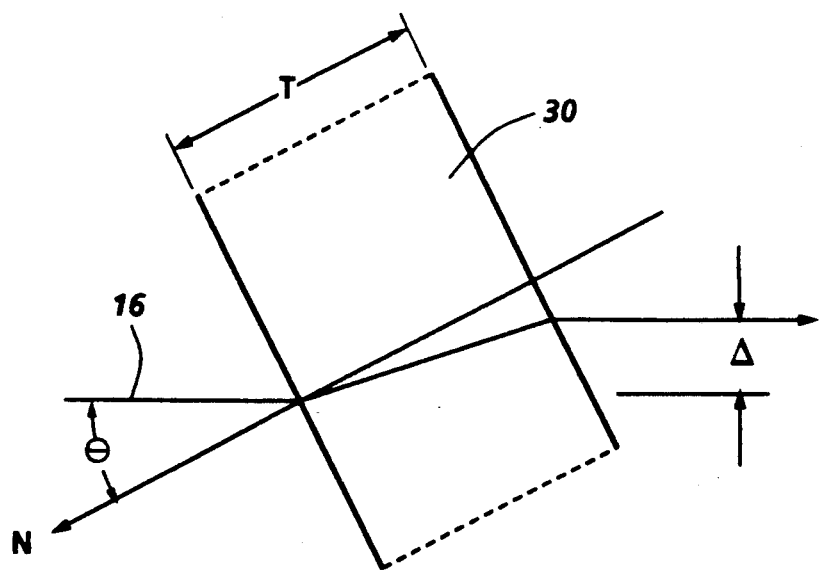
FIG. 3 is a schematic view showing an optical principle relevant to the present invention.

FIG. 3 illustrates the general principle by which optical element 30 can be used to rectify skew and bow. Optical element 30 has refractive properties by which an angular displacement $\theta$ of the optical element 30 relative to incident beam 16 results in a linear displacement $\Delta$ on the opposite side. The refractive property of optical element 30 results in a refraction of the light beam 16 on the first surface (the left side in FIG. 3) and a complementary refraction on the second surface (on the right side). Even though the preferred embodiment of the invention provides a flat plate for the optical element 30, each section of the optical element 30 is in effect a lens, and either the first surface or the second surface of the flat plate can be considered the principal plane of the lens.

According to Snell's law, light projected through a thin plane sheet of optically transparent material of thickness T and index of refraction N, mounted at an angle $\theta$, is deflected by amount $\Delta$:

$$\Delta = T \sin \theta [1 - \sqrt{(1 - \sin^2\theta/N^2 - \sin^2\theta)}].$$

For small angles $\theta$, the quantity in square brackets can be replaced by the factor $[1 - 1/N]$ so that:

$$\Delta = T \sin \theta [1 - 1/N]$$

Figure 4:
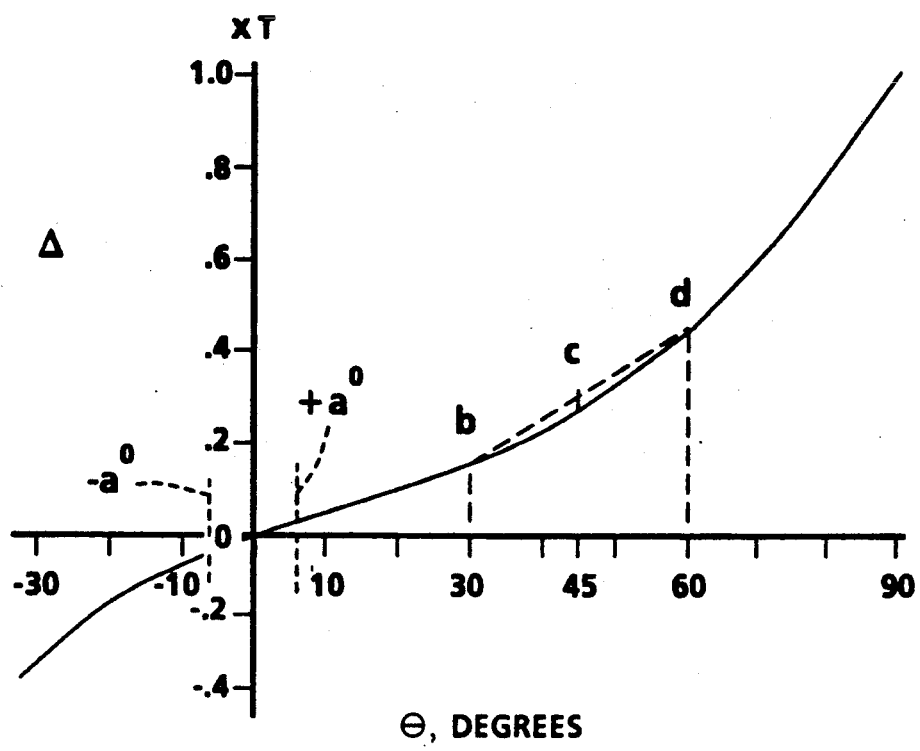
FIG. 4 is a graph showing the relationship between angular and linear displacement in the present invention.

A graph showing the relationship between $\theta$ and $\Delta$ is shown in FIG. 4. In this graph, the situation of FIG. 2, wherein the ends of the optical element 30 are twisted at small angles $\pm a°$ about a midpoint positioned at 0°, is shown by the points on the x-axis of the graph on either side of the origin. As can be seen by the graph, for small values of $\theta$, the function is practically linear.

To correct for angular skew, the plate is twisted through X degrees (where X represents the total difference in angle between $-a°$ and $+a°$) about its midpoint angle $X_0$, which as mentioned above is here 0°. Torsional forces distort the plate into a helix so that the local angle at each point along the optical element is proportional to the location of the point on the element. Thus, a twist of X degrees about $X_0$ may be described:

$$\theta_{(X)} = \theta_{(X_0)} + K(X - X_0)$$

and:

$$\Delta_{(X)} = T\theta_{(X)}[1 - 1/N] = KT[1 - 1/N](X - X_0)$$

which will have the effect of rotating the scan line 20 on photoreceptor 18 through a skew angle of $$\text{Skew} = \tan^{-1}(KT[1 - 1/N])$$

where K depends on the twist of the plate. Thus, a twisting of the optical element 30 will cause a displacement of the scan line 20 at the endpoints of the scan line 20, and, because the local displacement almost linearly decreases as one moves from an endpoint of the optical element 30 to the midpoint, in effect results in a rotation of the scan line 20 on the photoreceptor 18. This rotation will cause a skew in an unskewed beam 16, and for that reason can be used to counteract a pre-existing skew in beam 16.

With an index of N=1.5, the curve in FIG. 4 can be represented by a straight line out to ±5° (a total twist of 10 degrees) with less than 0.375% error. Deflection at 5 degrees is about 0.02 T. Thus a plate thickness of 0.200" will allow a displacement of the endpoints of scan line 20 of up to 4 mils, skewing a 10 inch-long scan line 20 by about 0.045 degrees, which is generally sufficient for real-world situations. Although the above deflection formula applies to plane waves, typical numerical apertures of laser scanners are so low that the plate does not introduce noticeable aberrations.

Figure 5:
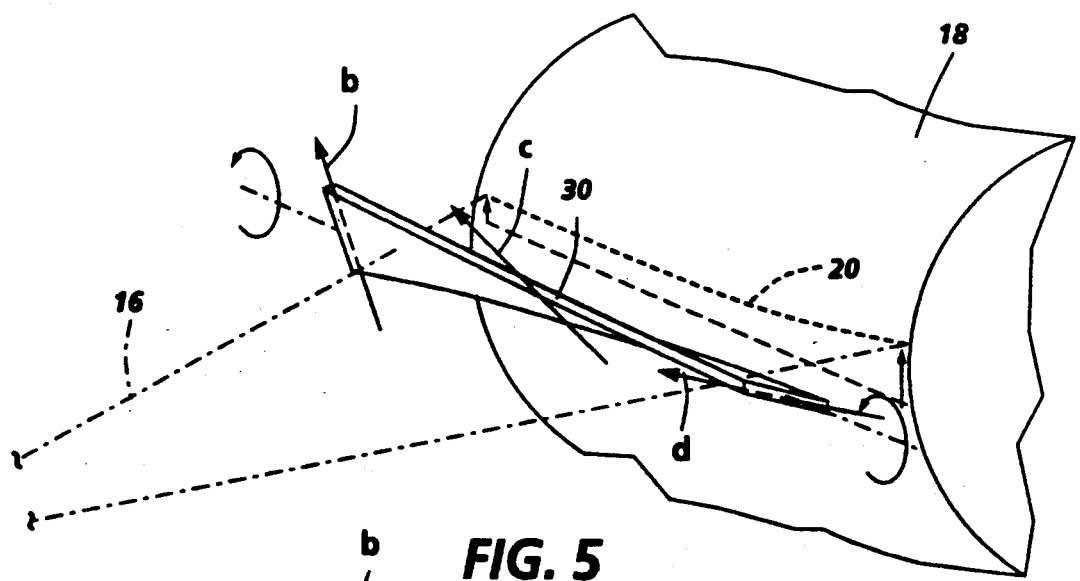
FIG. 5 is an elevational view of another type of optical element of the present invention, in conjunction with a photoreceptor.

While the above technique, twisting the optical element 30 about a small angle relative to a plane parallel with the photocreptor surface, is useful for eliminating skew alone from a beam 16, the problem of eliminating bow requires positioning of the optical element 30 so that its primary plane at the midpoint is set at a selected angle relative to the photoreceptor, and then twisting the optical element as shown above. Such an arrangement is illustrated in FIG. 5. In FIG. 5 the optical element 30 is shown positioned at its midpoint at an angle c relative to the relevant tangent of the photoreceptor 18, while the ends of the optical element 30 are twisted so that one end is at a relatively shallow angle b and the other at a relatively steep angle d.

The linear displacements of the beam 16 at typical values of angles b, c, and d are seen by their corresponding letters in the graph of FIG. 4. As is clear from the graph, the relationship between $\theta$ and $\Delta$ is strongly nonlinear between 20° and 70°. By "nonlinear" is implied that, at each point on the optical element 30, the amount of local linear displacement does not vary linearly as one moves from an end of the optical element 30 to the midpoint. As can be seen, the greatest discrepancy between the theoretical linear displacement (that is, assuming a linear relationship between $\theta$ and $\Delta$) and the actual linear displacement occurs around 45°. If c is set close to 45°, the discrepancy will be relatively less at the endpoints at angles b and d. The fact that there is less linear displacement than "expected" at the angle c results in a bow at c relative to b and d; that is, there will be less angular displacement of beam 16 at the midpoint than at the endpoints. This non-linearity between $\theta$ and $\Delta$ along the optical element 30 can be exploited to create a bow in the beam 16, which can be used to counteract an inherent bow in the beam 16.

The position and orientation of the optical element 30 in FIG. 5 has the effect of creating (and thereby counteracting a pre-existing) bow in a beam 16, but the twisting of the optical element 30, regardless of the angle of the midpoint c, will result in a skewing of the scan line 20, just as in the case of FIG. 2. This additional skewing can be seen by inserting a typical positive value of c for the angle $X_0$ in the above equations: for any twist angle X not equal to $X_0$, a skew will result. This skewing caused by the optical element 30 may be used to counteract a pre-existing skew in scan line 20, but if no compensatory skewing is necessary, the skewing caused by removal of the bow must itself be removed.

Figure 6:
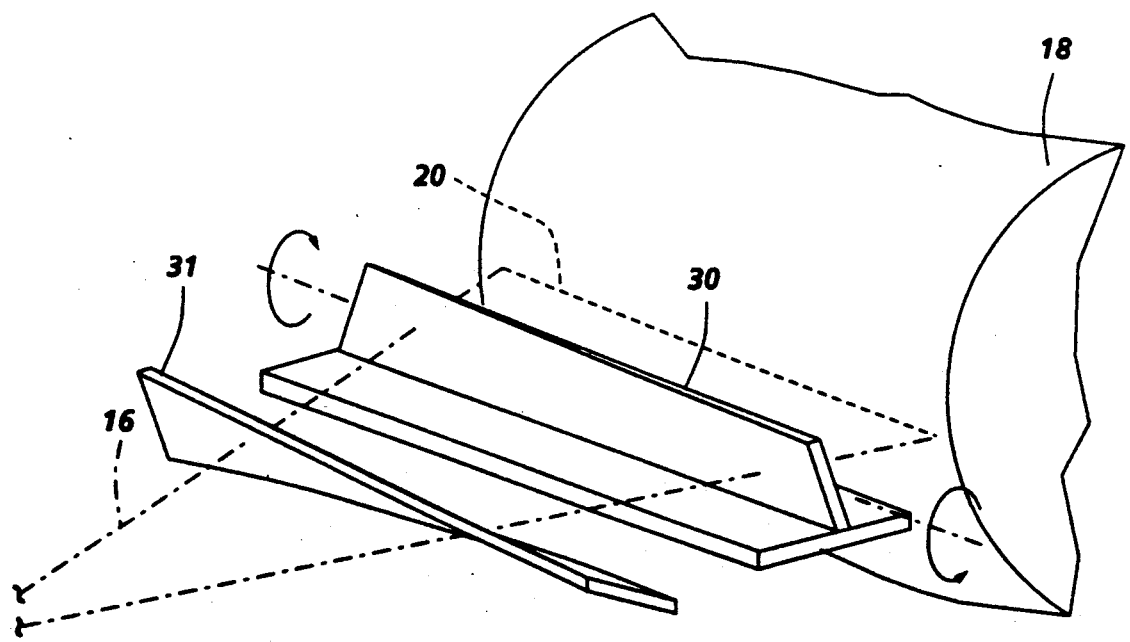
FIG. 6 is an elevational view of an alternate emobodiment of the present invention.

An arrangement for counteracting the skew caused by removal of the bow is shown in FIG. 6. Simply, two optical elements as described above are provided in series. The two optical elements 30, 31 need not be arranged in any order. One of the elements is positioned at a finite angle c at its midpoint, and then twisted about the midpoint; the other is twisted about a midpoint at 0°. The first element creates (even as it counteracts) skew and bow; the other, as necessary, counteracts any additional skew caused by the first element.

Figure 7:
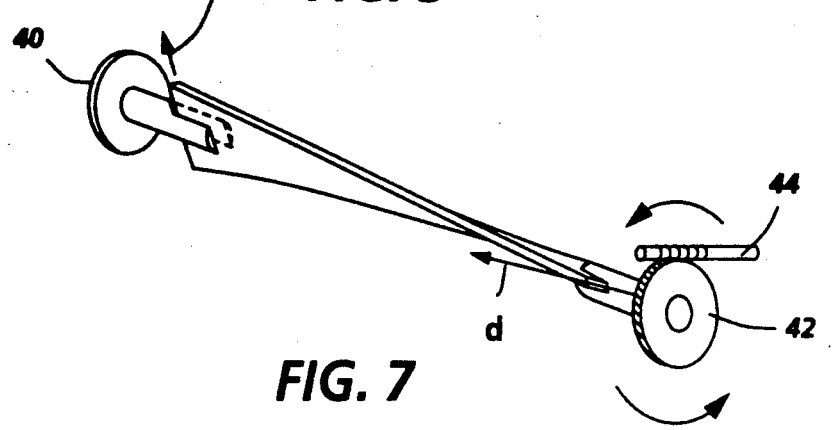
FIG. 7 is a simplified view of a preferred mounting arrangement of the present invention.

FIG. 7 shows a preferred arrangement for mounting the optical elements 30 of the present invention. The optical element 30 is held between two rotatable mounts 40, 42. When a particular apparatus, such as a photocopier, is being adjusted, each of the mounts are rotated and fixed as necessary, either at angles corresponding to $+a°$ and $-a°$, or angles b and d. One or both mounts 40, 42 may be finely adjustable by means such as worm gear 44, which interacts with an edge 42 around the mount. This arrangement is advantageous for "tweaking" individual machines in a manufacturing series, wherein the individual machines may each have different anomalies of skew and/or bow to be corrected.

While this invention has been described in conjunction with a specific apparatus, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. A skew and bow correction system for a scanning apparatus of the type providing a line of beam scanning from a source across a photosensitive surface, comprising:

at least one optical element, having a nonunitary index of refraction, disposed between the source and the surface, having an axis along the line of beam scanning, and having a principal plane associated therewith, wherein the principal plane of the optical element at the midpoint of the line of beam scanning is positioned along the line of beam scanning at a first angle relative to the surface, and wherein the principal plane of the optical element at each end of the scan line is oriented about the axis at a twist angle relative to the first angle, and wherein the value of the first angle is related to the skew and the bow of the scan line on the surface, and the values of the twist angles are related to the skew of the scan line on the surface.

2. A system as in claim 1, wherein the twist angles are equal and opposite second angles relative to the first angle.

3. A system as in claim 1, wherein the optical element is a twistable flat plate.

4. A system as in claim 3, wherein the optical element is made of a flexible, optical-grade plastic material.

5. A system as in claim 3, further comprising adjustment means for adjusting the first angle and the twist angles of the optical element.

6. A skew and bow correction system for a scanning apparatus of the type providing a line of beam scanning from a source across a photosensitive surface, comprising:

at least one optical element, made of a flexible material having a nonunitary index of refraction, disposed between the source and the surface, having an axis along the line of beam scanning, and having a principal plane associated therewith, wherein the principal plane of the optical element at the midpoint of the line of beam scanning is positionable along the line of beam scanning at a first angle relative to the surface, and wherein the principal plane of the optical element at the ends of the scan line is orientable about the axis at equal and opposite twist angles relative to the first angle; and adjustment means for adjusting the first angle and the twist angles of the optical element so that the value of the first angle is related to the skew and the bow of the scan line on the surface, and the values of the twist angles are related to the skew of the scan line on the surface.

7. A skew correction element for a scanning apparatus of the type providing a line of beam scanning having a midpoint and two endpoints from a source across a photosensitive surface, comprising:

an optical element, disposed between the source and the photosensitive surface, in the form of a substantially transparent plate having a nonunitary index of refraction, having an axis extending along the line of beam scanning, and having two parallel surfaces, wherein the parallel surfaces at the midpoint of the line of beam scanning are parallel to the photosensitive surface, and wherein the parallel surfaces at each endpoint of the line of beam scanning are oriented at twist angles along the axis relative to the photosensitive surface.

8. An element as in claim 7, wherein the twist angles are equal and opposite angles relative to the photosensitive surface.

9. An element as in claim 7, wherein the optical element is mounted on a vibration damping member.

10. An element as in claim 7, wherein the optical element is a twistable flat plate.

11. An element as in claim 7, further comprising means for adjusting the twist angles at at least one endpoint of the line of beam scanning.

12. A system as in claim 7, wherein the optical element is made of a flexible, optical-grade plastic material.

13. A correction system for a scanning apparatus of the type providing a line of beam scanning having a midpoint and two endpoints from a source across a photosensitive surface, comprising:

a first optical element, having a principal plane associated therewith, wherein the principal plane of the first optical element at the midpoint of the line of beam scanning is positionable along the line of beam scanning at a first angle relative to the photosensitive surface, and wherein the principal plane of the first optical element at each endpoint of the line of beam scanning is orientable at a first twist angle relative to the first angle, and a second optical element, having a principal plane associated therewith, wherein the principal plane of the second optical element at the midpoint of the line of beam scanning is parallel with the photosensitive surface and the principal plane of the second optical element at each endpoint of the line of beam scanning is orientable at a second twist angle relative to the photosensitive surface, the first and second optical elements being disposed in series between the source and the surface, and wherein the value of the first angle is related to the skew and the bow of the line of beam scanning, and the values of the first twist angles are related to the skew of the line of beam scanning, and wherein the values of the second twist angles are related to the skew of the line of beam scanning resulting from the first optical element.

14. An element as in claim 13, wherein the first twist angles are equal and opposite angles relative to the first angle, and the second twist angles are equal and opposite angles relative to the photosensitive surface.

15. A system as in claim 13, wherein at least one optical element is a twistable flat plate.

16. A system as in claim 15, wherein at least one optical element is made of a flexible, optical-grade plastic material.

17. A system as in claim 15, further comprising adjustment means for adjusting the angles of at least one optical element.

* * * * *